Dec. 2, 1958 J. R. PIERCE 2,863,126

TAPERED WAVE GUIDE DELAY EQUALIZER

Filed Dec. 31, 1953

INVENTOR
J. R. PIERCE
BY Hugh S. Wertz
ATTORNEY

United States Patent Office 2,863,126
Patented Dec. 2, 1958

2,863,126

TAPERED WAVE GUIDE DELAY EQUALIZER

John R. Pierce, Berkeley Heights, N. J., assignor to Bell Telephone Laboratories, Incorporated, New York, N. Y., a corporation of New York Application December 31, 1953, Serial No. 401,448

8 Claims. (Cl. 333—28)

This invention relates to broad band high frequency electromagnetic wave guides and apparatus associated therewith, and more specifically to the selective delay of electromagnetic signals of different frequencies in such systems.

It is well known that in many transmission systems waves of different frequencies are not propagated at the same velocity. Furthermore, in a long, broad band, high frequency transmission system, substantial distortion of the transmitted signal may result from the cumulative effect of this phenomenon. At lower frequencies this phase delay distortion, as it is called, has been corrected heretofore by the use of suitable equalizing networks employing lumped inductances and capacitances. In the microwave frequency region, however, these lumped constant networks are impractical and it is not believed that any effective substitute for these networks at high frequencies has been developed up to the present time.

Accordingly, one object of this invention is to correct, simply and inexpensively, phase delay distortion in microwave systems.

In addition to the equalization of the phase delay distortion in extended transmission lines, there are other uses for a simple microwave component which selectively delays electromagnetic signals of different frequencies. An illustrative example of such a system is a radar system in which the generated pulses are of moderately long duration and progressively shift in frequency from the beginning to the end of the pulse. The effect of a dispersive delay element which has a delay vs. frequency characteristic which complements that of the pulse generator is to peak-up or "sharpen" the pulse, so that it has a much higher effective instantaneous intensity than would otherwise be possible.

Thus, a broad object of the invention is to selectively delay microwave signals extending over a broad band of frequencies in a simple and flexible manner.

The present invention in one of its broad aspects is based on the discovery that when an electromagnetic wave including a broad band of frequencies is applied to a tapered wave guide which is constricted gradually to a width below cut-off, the reflected signal undergoes delay dispersion. The physical reasons underlying this phenomenon are that electromagnetic waves are totally reflected from a taper which is constricted below cut-off, and the higher frequency components which penetrate more deeply into the taper have a greater elapsed time before returning to the input than the low frequency components. In accordance with a more specific aspect of the invention it has been discovered that the frequency selective delay of a reflecting wave guide taper is of the proper sign to compensate for the phase delay distortion of an extended wave guide transmission line.

Additional objects and certain features and advantages of the invention will be developed in the course of the detailed description of the drawings.

Figure 1:
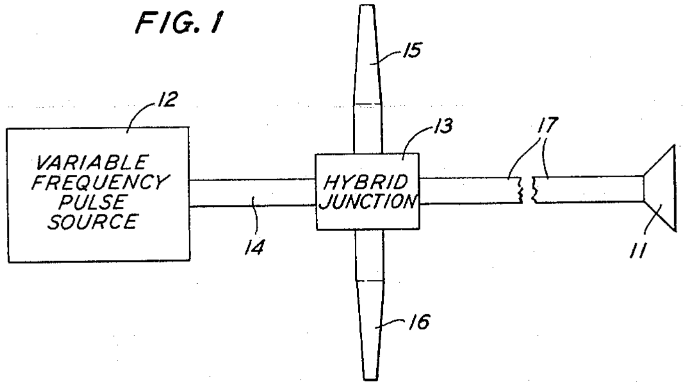
Fig. 1 illustrates the use of tapered reflecting wave guide elements to increase the intensity of transmitted pulses.

Fig. 1 shows, by way of example and for purposes of illustration, a pulse system in which the instantaneous pulse output level at the transmitting antenna or horn 11 may be substantially greater than that at the output of the pulse source 12. This effect is particularly useful in pulse-echo systems where the pulse intensities may determine the range of the equipment. Systems which operate in this manner are discussed in detail in S. Darlington's application Serial No. 136,289 filed December 31, 1949, now United States Patent No. 2,678,997, granted May 18, 1954, and will be reviewed but briefly here.

In Fig. 1, the pulse source 12 produces pulses which are of moderately long duration and vary from a high frequency at the start of the pulse to a substantially lower frequency at the end of the pulse. These pulses from the pulse generator 12 are coupled to the hybrid junction 13 by means of the wave guide 14. The energy applied to the hybrid junction divides with one half of the energy entering each of the taper sections 15, 16. These taper sections 15, 16 taper from a large dimension which is greater than cut-off for the lowest frequencies in the original pulse to the constricted end which is less than cut-off for the highest frequencies in the original pulse. With each frequency component of the original pulse being reflected from the tapers at the cut-off point for that particular frequency, it is clear that the high frequency components will penetrate deeper into the taper sections than the lower components.

Because of this greater depth of penetration, the reflected higher frequency components have a longer round trip transmission path and a correspondingly increased elapsed time before returning to the hybrid junction than the lower frequency components of the original pulse. With the difference in elapsed time for the highest and lowest frequency components being made equal to the pulse length, the reflected high and low frequency components will arrive at the hybrid junction at substantially the same instant. This will greatly increase the instantaneous amplitude of the pulse which is coupled to the output antenna 11 by the wave guide 17.

In order to avoid unduly high energy levels, the "pulse sharpener" unit comprising the hybrid junction and the two wave guide taper sections may be employed at the input to the pulse-echo receiver (not shown) rather than at the transmitter output. Various alternatives may be employed to couple one or more tapered wave guide sections to the transmitter or receiver of the pulse system. Specifically, various types of hybrid junctions such as the "Magic-T" or the "Riblet Coupler" (see Fig. 3) may be employed.

Figures 2, 3:
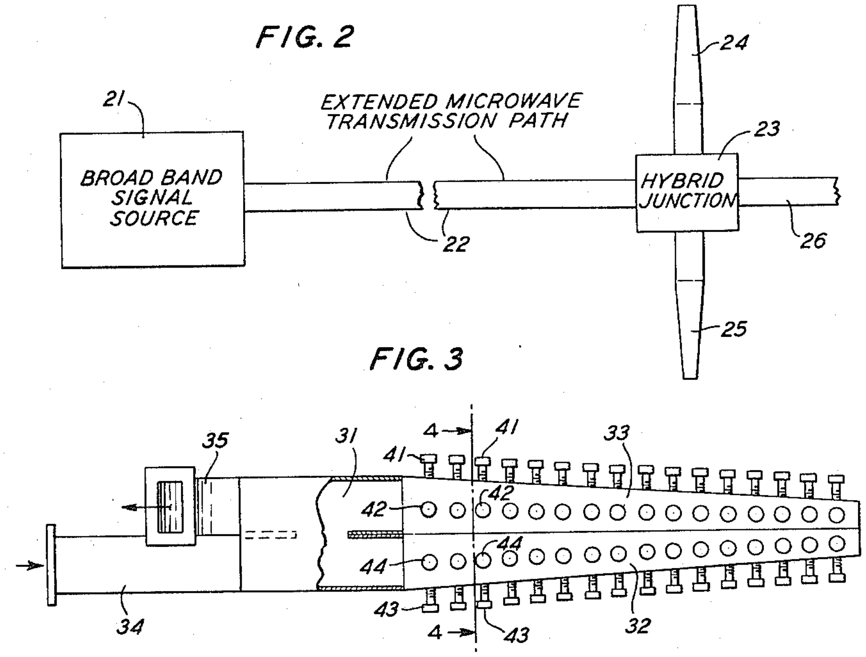
Fig. 2 represents the use of tapered wave guide elements for the equalization of phase delay distortion introduced by an extended high frequency transmission line.
Figs. 3 and 4 show one means of coupling between the wave guide taper sections and the input and output wave guides of Figs. 1 and 2.

Fig. 2 represents the use of tapered wave guide elements to correct for the phase delay distortion of an extended transmission path. It is well known that in many transmission systems waves of different frequencies are not propagated at the same velocity. Thus, in the transmission of a broad band high frequency signal over a long microwave path the higher frequencies travel at a greater velocity than the lower frequencies, this giving rise, if uncorrected, to perceptible, and in some cases, serious distortion of the signals. In accordance with one aspect of the present invention, it has been determined that tapered reflecting wave guide elements introduce dispersive delay which is of the proper sign to compensate for this phase delay distortion.

In Fig. 2 the broad band signal from the source 21 is transmitted over an extended microwave transmission path 22 to a delay equalization unit made up of the hybrid junction 23 and the two tapered reflecting elements 24 and 25. From this hybrid junction 23 the signals reflected from the two tapered elements are transmitted to the output wave guide 26 because of the inherent phase reversal exhibited by one path through hybrid 23 relative to the other path, and the advantage taken of this phase shift by the conventional use of a one quarter wave length longer path for connecting one reflecting element to the hybrid, as disclosed in the above-mentioned Darlington patent. Inasmuch as the equalization will normally be accomplished at an amplification point along the transmission line, suitable amplification means (not shown) may be incorporated into the circuit between the hybrid 23 and the output wave guide 26.

The unit made up of the hybrid junction 23 and the two wave guide tapers 24 and 25 may be of the same construction as the hybrid junction 13 and the two tapered elements 15, 16 of Fig. 1. The property of this assembly of delaying high frequency components of an applied microwave signal to a greater extent than low frequency components is employed in the system of Fig. 2 to correct for the delay distortion introduced by the extended microwave transmission path 22.

In Fig. 3 a structural assembly of a hybrid junction 31 and two adjustable tapered wave guide elements 32 and 33 is shown. The hybrid is of a type known as a "Riblet hybrid," and its properties are discussed in detail in an article entitled "The Short-Slot Hybrid Junction" by Henry R. Riblet, which appeared in the Proceedings of the I. R. E. at pages 180–184 in February, 1952. The input to the hybrid and taper structure is by way of the wave guide section 34. Energy applied to wave guide section 34 is coupled to the two tapered wave guide sections 32 and 33 with the energy splitting equally at the Riblet hybrid 31. Energy reflected from the two taper sections, however, will be coupled to the output wave guide 35, and none of it will appear at the input wave guide 34.

Figure 4:
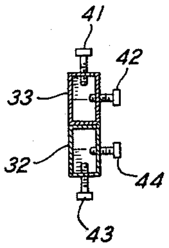

Mathematical analysis indicates that extreme accuracy is required in order to have the waves reflected from the taper sections 32 and 33 in the correct phase relationship with each other and with the external circuit components with which it must operate at all frequencies. The two taper sections 32, 33 are therefore manufactured by die casting about a very accurate polished mandrel, and are then clamped together as illustrated in Figs. 3 and 4 in order to avoid differences in dimensions which might otherwise result from temperature differentials between the two parts. In addition, the taper sections are provided with conducting screws 41, 42, 43 and 44 to adjust the effective width of the taper at any point along its length. The critical dimension of a taper for cut-off purposes is its widest cross-sectional dimension. This critical dimension can be varied somewhat by the adjustment of the screws 41 through 44. If the screws 42 and 44, which are parallel to the electric vector, are screwed in, the effect is essentially to make the guide act as if it were wider and thus to lower the cut-off frequency; however, the effect of advancing screws 41 and 43, which are perpendicular to the electric vector, is to make the guide act as if it were narrower and thus to raise the cut-off frequency.

The fact that the lower frequencies do not penetrate very far into the tapered wave guides makes it relatively easy to adjust these taper sections. For example, when the unit of Figs. 3 and 4 is employed in place of the hybrid junction 23 and tapered elements 24, 25 of Fig. 2 the following adjustments are made:

First, only one of the taper elements such as 32 is employed and its characteristics are adjusted to compensate for the phase delay distortion of the microwave path 22 by adjusting screws such as 43, 44 from the wider end of the taper down toward the narrower end of the taper. In making these adjustments starting with low frequency components and proceeding to higher frequency components of the transmitted microwave signal, the later adjustments at the narrower end of the taper sections do not affect the earlier adjustments inasmuch as the lower frequency components do not penetrate deeply into the taper sections. After one taper section 32 has been adjusted to have the proper characteristics, the other section 33 is tuned from its broad end to its narrow end so that the wave reflected therefrom is exactly in phase with that reflected from the taper section 32 in the output wave guide 35.

In both the system of Fig. 1 and that of Fig. 2 it may be noted that the delay versus frequency dispersion characteristic of the tapers is arranged to compensate for an opposite delay versus frequency dispersion characteristic of another electrical component of the system. Thus in Fig. 1 the delay dispersion characteristic of the tapers 15 and 16 are complementary with the output characteristics of the pulse source 12, and in Fig. 2 the delay versus frequency characteristic of the tapers 24 and 25 complement the characteristic of the transmission path 22.

In the present specification and claims it is to be understood that the term "tapered wave guide sections" refers to either the physical tapering of the wave guide sections or the electrical equivalent thereof. For example, the conducting wave guide sections 32 and 33 of Figs. 3 and 4 could be of uniform cross-section, but could be tapered electrically by having the screws on the narrow sides of the wave guides penetrate progressively further into the wave guide along its length. A similar effect could be obtained by the appropriate use of a tapered element of dielectric material in a wave guide of constant cross-section. Because the presence of dielectric material increases the effective cross-section of the wave guide, the tapered dielectric element should have its thickest portion toward the source of the microwave energy (toward the hybrid junction in Figs. 1 and 2).

It is noted that an application of W. J. Albersheim Serial No. 401,544, which was filed concurrently with this case, deals with closely related subject matter.

It is to be understood that the above-described arrangements are illustrative of the application of the principles of the invention. Numerous other arrangements, such as the use of tapered wave guides of circular or other known configurations or constructions may be devised by those skilled in the art without departing from the spirit and scope of the invention.

What is claimed is:

1. In a broad band high frequency system, a reflecting tapered section of wave guide, means for applying a broad band signal to said tapered wave guide section, said tapered section having a width that successively reflects frequency components of said broadband signal with a phase delay proportional to the depth of penetration into said taper thereby introducing a predetermined reflection frequency versus phase delay characteristic, means for coupling with the signal which is reflected from said tapered wave guide section, and a high frequency electrical component having a frequency versus phase delay characteristic which is complementary with said predetermined characteristic coupled to one of said above-mentioned means.

2. In combination, a wave guide, a reflecting section of wave guiding channel having an input end coupled to said guide and having a conductive boundary tapering continuously through decreasing transverse cross-sections from said input to an end of total reflection for all wave energy applied thereto, the configuration of said conductive boundary determining successively different cut-off frequencies along the length of said section, the relationship between the delay-introducing distance along said section at which successive cross-sections are cut off and the cut-off frequency thereof defining a frequency versus delay characteristic, and additional wave guide means coupled to said channel section for receiving reflected energy therefrom.

3. A combination as set forth in claim 2 wherein a plurality of adjustable screws are located along the length of said channel section for varying the conductive boundary configuration of said channel section.

4. In a broad-band high frequency system, a high frequency electrical component having an associated frequency versus delay dispersion characteristic, means for coupling said component with a reflecting section of wave guiding channel having a conductive boundary tapering continuously through decreasing transverse cross-sections to determine successively different cut-off frequencies along the length of said section, the relationship between the delay-introducing distance along said section at which successive cross-sections are cut off and the cut-off frequency thereof defining a frequency versus delay characteristic complementary to the above-mentioned component characteristic, and additional wave guide means coupled to said channel section for receiving reflected energy therefrom.

5. A combination as set forth in claim 4 wherein a plurality of adjustable screws are located along the length of said channel section for varying the continuous cross-section distribution of said conductive boundary.

6. A combination as set forth in claim 4 wherein there are two of said reflecting wave guide sections and a wave guide branching circuit coupling said sections to said high frequency electrical component and to said additional wave guide means.

7. In combination with a source of microwave energy having a phase-delay characteristic that decreases as the frequency of the wave energy increases, a section of wave guide having a tapered cut-off characteristic that progressively reflects wave energy components of increased frequency as the wave applied to one end of said section propagates into said section, means for coupling wave energy from said source to said one end of said section, and means for receiving wave energy reflected by said section.

8. In combination, a source of electromagnetic wave energy pulses having a frequency composition that varies during the duration of the pulse, a tapered section of wave guide that successively reflects increasing frequency components of said pulse with a phase delay proportional to the depth of penetration into said taper, means for applying said pulses to said section and means for receiving the energy reflected by said taper.

References Cited in the file of this patent

UNITED STATES PATENTS

| | | |
|---|---|---|
| 2,438,915 | Hansen | Apr. 6, 1948 |
| 2,444,060 | Ohl | June 29, 1948 |
| 2,510,288 | Lewis et al. | June 6, 1950 |
| 2,514,779 | Martin | July 11, 1950 |
| 2,547,412 | Salisbury | Apr. 3, 1951 |
| 2,602,895 | Hansen | July 8, 1952 |
| 2,643,296 | Hansen | June 23, 1953 |
| 2,649,576 | Lewis | Aug. 18, 1953 |
| 2,676,306 | Lanciani | Apr. 20, 1954 |
| 2,767,379 | Mumford | Oct. 16, 1956 |

FOREIGN PATENTS

| | | |
|---|---|---|
| 650,614 | Great Britain | Feb. 28, 1951 |